United States Patent
Aikawa

(10) Patent No.: US 9,641,001 B2
(45) Date of Patent: May 2, 2017

(54) ELECTRONIC APPARATUS AND METHOD

(71) Applicant: CANON KABUSHIKI KAISHA, Tokyo (JP)

(72) Inventor: Iori Aikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 14/571,879

(22) Filed: Dec. 16, 2014

(65) Prior Publication Data

US 2015/0171635 A1    Jun. 18, 2015

(30) Foreign Application Priority Data

Dec. 18, 2013  (JP) ................................. 2013-261511

(51) Int. Cl.
| | | |
|---|---|---|
| H02J 5/00 | (2016.01) | |
| H02J 7/02 | (2016.01) | |
| H02J 7/00 | (2006.01) | |
| H02J 17/00 | (2006.01) | |

(52) U.S. Cl.
CPC .............. *H02J 5/005* (2013.01); *H02J 7/007* (2013.01); *H02J 7/0029* (2013.01); *H02J 7/025* (2013.01); *H02J 17/00* (2013.01); *H02J 2007/0037* (2013.01)

(58) Field of Classification Search
CPC ..................................................... H02J 5/005
USPC ........................................................ 320/108
See application file for complete search history.

(56) References Cited

U.S. PATENT DOCUMENTS

| | | | |
|---|---|---|---|
| 2007/0083778 A1* | 4/2007 | Nagano ................... | G06F 1/206 713/300 |
| 2009/0001932 A1 | 1/2009 | Kamijo | |
| 2009/0096413 A1 | 4/2009 | Partovi | |
| 2010/0001845 A1 | 1/2010 | Yamashita | |
| 2011/0046699 A1 | 2/2011 | Mazanec | |
| 2011/0140538 A1 | 6/2011 | Jung et al. | |
| 2013/0314069 A1 | 11/2013 | Suzuki | |

FOREIGN PATENT DOCUMENTS

| | | |
|---|---|---|
| CN | 101964552 A | 2/2011 |
| JP | 2013-005615 A | 1/2013 |
| RU | 2439765 C1 | 1/2012 |
| RU | 2011152904 A | 7/2013 |

* cited by examiner

*Primary Examiner* — Thuan Do
(74) *Attorney, Agent, or Firm* — Canon U.S.A., Inc. IP Division

(57) ABSTRACT

An electronic apparatus includes a power receiving means for wirelessly receiving power, a detection means for detecting whether the electronic apparatus is in a predetermined state, a load means supplied with power from the power receiving means, and a control means that performs control so a second power is supplied from the power receiving means to the load means if the detection means detects that the electronic apparatus is in the predetermined state and a first power is supplied from the power receiving means to the load means, wherein the second power is lower than the first power, and the control means further performs control so the first power is supplied from the power receiving means to the load means if the detection means detects the electronic apparatus is in a state different from the predetermined state and the supplied power is reduced to a predetermined power value or less.

12 Claims, 10 Drawing Sheets

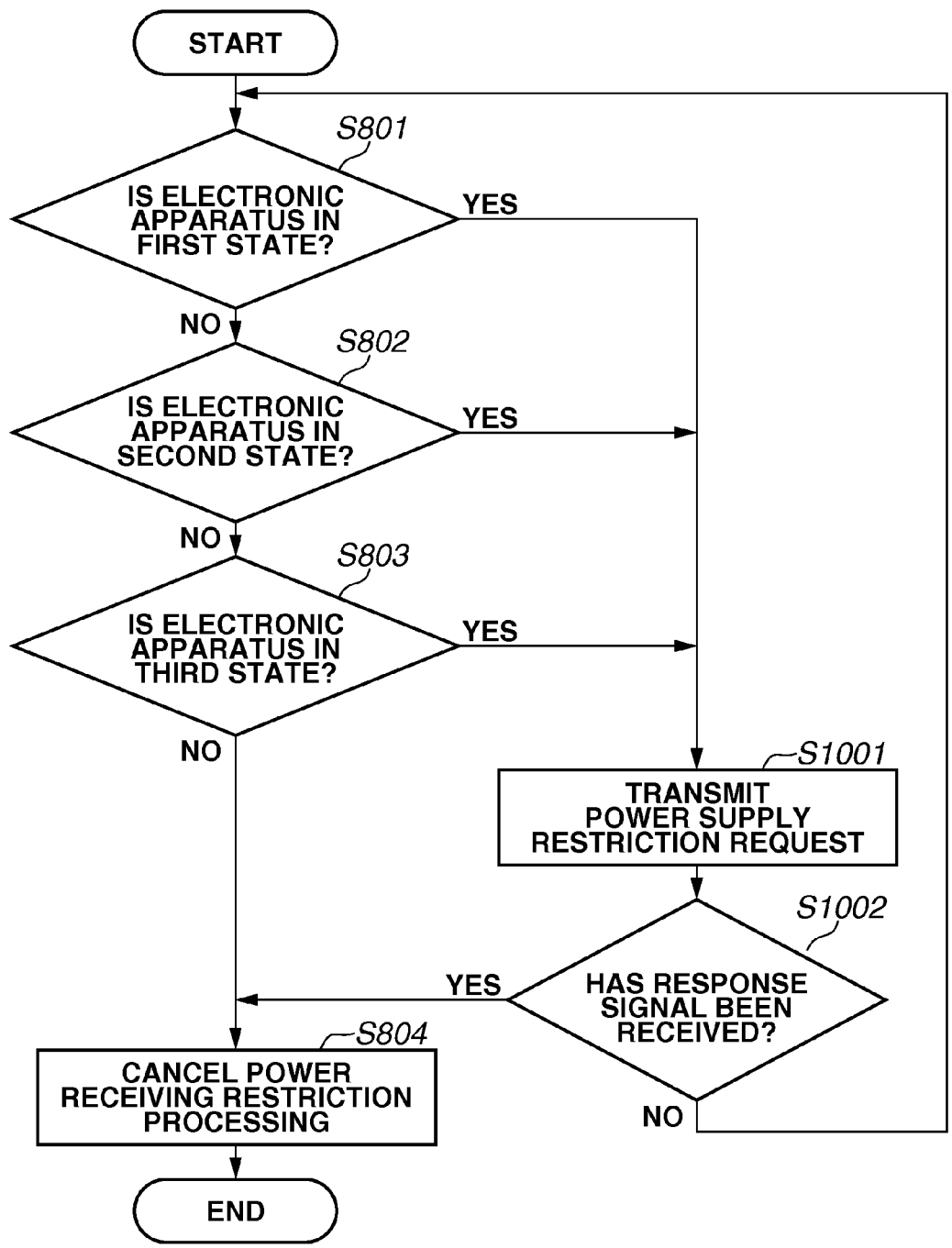

US 9,641,001 B2

ELECTRONIC APPARATUS AND METHOD

BACKGROUND OF THE INVENTION

Field of the Invention

The present invention relates to an electronic apparatus that wirelessly receives power from a power supply apparatus.

Description of the Related Art

In recent years, a power supplying system including a power supply apparatus having a power supply antenna that wirelessly output power without being connected by a connector and an electronic apparatus having a power receiving antenna that wirelessly receives the power supplied from the power supply apparatus, has been known.

Japanese Patent Application Laid-Open No. 2013-5615 discusses an electronic apparatus that discharges power received from a power supply apparatus when it enters an abnormal state in such a power supplying system.

However, a conventional electronic apparatus discharges power received from a power supply apparatus when it enters an abnormal state. Thus, the power supplied from the power supply apparatus is wasted.

SUMMARY OF THE INVENTION

The present invention is directed to preventing power supplied from a power supply apparatus, from being wasted in an electronic apparatus.

According to an aspect of the present invention, at least one of the above-described drawbacks and disadvantages can be overcome.

According to yet another aspect of the present invention, an electronic apparatus includes a power receiving means configured to wirelessly receive power from a power supply apparatus, a detection means configured to detect whether the electronic apparatus is in a predetermined state, and a load means configured to be supplied with power received by the power receiving means, characterized in that the electronic apparatus includes a control means configured to, if the detection means detects that the electronic apparatus is in the predetermined state and a first power is supplied from the power receiving means to the load means, perform control such that a second power is supplied from the power receiving means to the load means, wherein the second power is lower than the first power, and if the detection means detects that the electronic apparatus is in a state different from the predetermined state and power supplied from the power supply apparatus is reduced to a predetermined power value or less, perform control such that the first power is supplied from the power receiving means to the load means.

According to yet another aspect of the present invention, a method for controlling an electronic apparatus includes wirelessly receiving power from a power supply apparatus, detecting whether the electronic apparatus is in a predetermined state, performing control such that, if the electronic apparatus is in the predetermined state and a first power is supplied from the power supply apparatus to a load means in the electronic apparatus, a second power is supplied from the power supply apparatus to the load means, wherein the second power is lower than the first power, and performing control such that, if the electronic apparatus is in a state different from the predetermined state and a power supplied from the power supply apparatus is reduced to a predetermined power value or less, the first power is supplied from the power supply apparatus to the load means.

Further features of the present invention will become apparent from the following description of exemplary embodiments with reference to the attached drawings.

BRIEF DESCRIPTION OF THE DRAWINGS

FIG. 10 is a flowchart illustrating an example of a return process of an electronic apparatus according to the second exemplary embodiment.

DESCRIPTION OF THE EMBODIMENTS

Various exemplary embodiments, features, and aspects of the invention will be described in detail below with reference to the drawings. However, this invention is not limited to the exemplary embodiments. Various modifications and changes can be made without departing from the scope of this invention.

A first exemplary embodiment of the present invention will be described in detail below with reference to the drawings.

Figure 1:
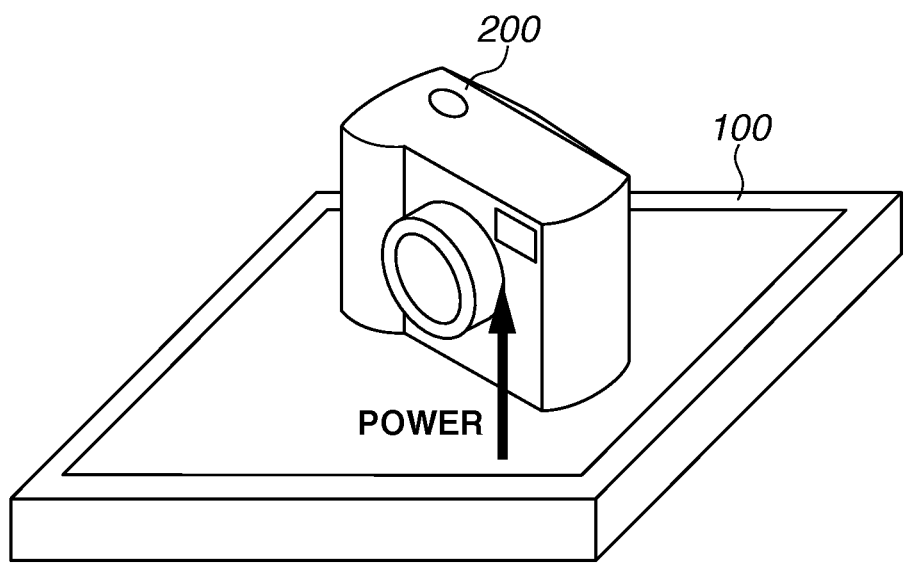
FIG. 1 illustrates an example of a power supplying system according to a first exemplary embodiment.

A power supplying system according to the first exemplary embodiment includes a power supply apparatus 100 and an electronic apparatus 200, as illustrated in FIG. 1. The power supply apparatus 100 includes a power supply antenna 108 for wirelessly outputting power to the electronic apparatus 200, and the electronic apparatus 200 includes a power receiving antenna 201 for wirelessly receiving the power output from the power supply apparatus 100.

If the electronic apparatus 200 is located in a predetermined area, the power supply apparatus 100 wirelessly transmits the power to the electronic apparatus 200 via the power supply antenna 108, while the electronic apparatus 200 receives the power wirelessly transmitted from the power supply apparatus 100 via the power receiving antenna 201, and charges a battery 210 connected to the electronic apparatus 200 using the received power. If the electronic apparatus 200 is not located in the predetermined area, the power supply apparatus 100 cannot supply the power to the electronic apparatus 200, and consequently the electronic apparatus 200 cannot receive the power from the power supply apparatus 100. The predetermined area is a range in which the power supply apparatus 100 and the electronic apparatus 200 can communicate with each other, for example.

The power supply apparatus 100 can wirelessly transmit the power to a plurality of apparatuses having similar functions to that of the electronic apparatus 200.

The electronic apparatus 200 may be a moving member such as a vehicle or a mobile device such as a digital camera or a mobile phone if it operates by power supplied from the battery 210. The electronic apparatus 200 may be a battery pack.

The power supplying system according to the first exemplary embodiment may be a system in which the power supply apparatus 100 transmits power to the electronic apparatus 200 by way of electromagnetic induction, and the electronic apparatus 200 receives the power from the power supply apparatus 100 by way of electromagnetic induction, or may be a system in which the power supply apparatus 100 transmits power to the electronic apparatus 200 by way of electromagnetic field resonance and the electronic apparatus 200 receives the power from the power supply apparatus 100 by way of electromagnetic field resonance.

(Power Supply Apparatus 100)

Figure 2:
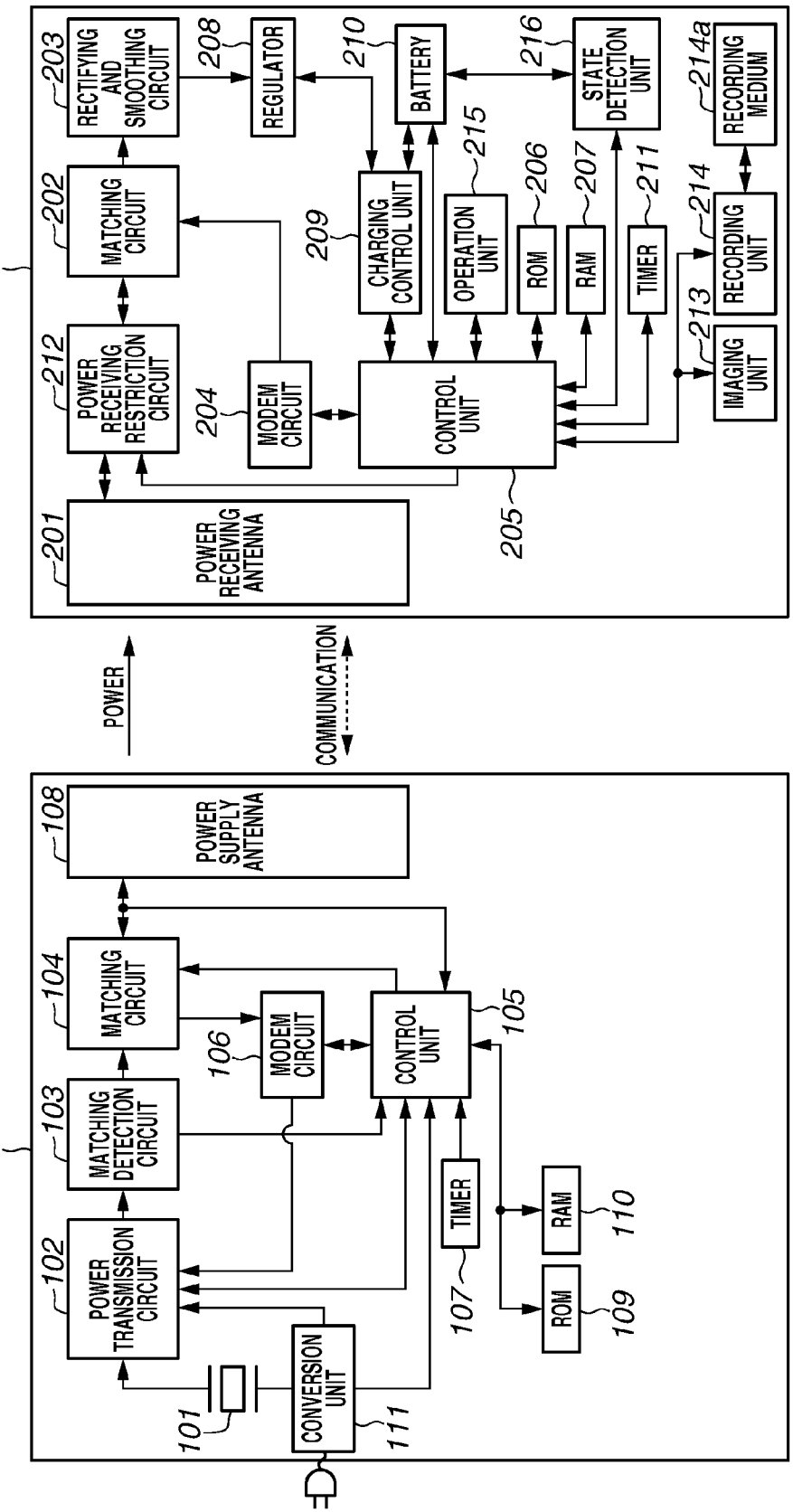
FIG. 2 is a block diagram illustrating an example of the power supplying system according to the first exemplary embodiment.

The power supply apparatus 100 will be described below with reference to FIG. 2. The power supply apparatus 100 includes an oscillator 101, a power transmission circuit 102, a matching detection circuit 103, a matching circuit 104, a control unit 105, a modem circuit 106, a timer 107, the power supply antenna 108, a read-only memory (ROM) 109, a random access memory (RAM) 110, and a conversion unit 111, as illustrated in FIG. 2.

The oscillator 101 oscillates at a high frequency used to supply power corresponding to a target value determined by the control unit 105 to the electronic apparatus 200. The oscillator 101 uses a crystal oscillator, for example.

The power transmission circuit 102 generates power to be output to the outside via the power supply antenna 108.

When an alternating current (AC) power source (not illustrated) and the power supply apparatus 100 are connected to each other, direct current (DC) power into which the conversion unit 111 has converted AC power is input to the power transmission circuit 102. The power transmission circuit 102 generates the power to be supplied to the outside via the power supply antenna 108 according to a frequency at which the oscillator 101 oscillates, and the input DC power. The power generated by the power transmission circuit 102 is supplied to the matching circuit 104 via the matching detection circuit 103.

The matching detection circuit 103 measures a voltage of a traveling wave of the power generated by the power transmission circuit 102 and a voltage of a reflection wave from the matching circuit 104. Then, the matching detection circuit 103 uses the measured voltage of the traveling wave of the power and the measured voltage of the reflection wave of the power, to detect a voltage standing wave ratio. Further, the matching detection circuit 103 uses the detected voltage standing wave ratio, to detect matching of impedance at an end of the matching circuit 104 and a characteristic impedance of a transmission line. A directional coupler and the like is employed as the matching detection circuit 103.

The matching circuit 104 is a resonance circuit for generating resonance between the power supply antenna 108 and the power receiving antenna 201 using the frequency at which the oscillator 101 oscillates. Further, the matching circuit 104 has a variable capacitor, a variable coil, and a variable resistor, and performs impedance matching of the matching detection circuit 103 and the power supply antenna 108.

The control unit 105 executes a computer program stored in the ROM 109, to control an operation of the power supply apparatus 100. The control unit 105 is a central process unit (CPU), for example. The control unit 105 is constituted by hardware devices.

The control unit 105 controls the power transmission circuit 102, to control power to be supplied to the electronic apparatus 200.

The control circuit 105 controls values of the variable capacitor and the variable coil in the matching circuit 104 to make the frequency at which the oscillator 101 oscillates match a resonant frequency f. The resonant frequency f may be a commercial frequency of 50 to 60 hertz (Hz), 10 to several hundred kilohertz (kHz), or around 10 megahertz (MHz). The resonant frequency f may be 150 to 250 kHz. The resonant frequency f may be 13.56 megahertz, or 6.78 MHz.

The control unit 105 controls the modem circuit 106, to transmit a command to the electronic apparatus 200.

The modem circuit 106 modulates the power generated by the power transmission circuit 102 according to a predetermined protocol to transmit a command for controlling the electronic apparatus 200 to the electronic apparatus 200.

The predetermined protocol may be a communication protocol such as International Organization for Standardization (ISO) 14443 or ISO 15693 used for Radio Frequency IDentification (RFID), for example. The predetermined protocol may be a communication protocol that is compatible with a Near Field Communication (NFC) standard.

The modem circuit 106 performs Amplitude Shift Keying (ASK) modulation with amplitude displacement on the power generated by the power transmission circuit 102, to transmit the command to the electronic apparatus 200.

The modem circuit 106 demodulates information and the command, which have been transmitted from the electronic apparatus 200, while receiving the demodulated information and command. When power for performing communication is supplied from the power supply apparatus 100 to the electronic apparatus 200, the electronic apparatus 200 performs load modulation on the power supplied from the power supply apparatus 100, to transmit at least one of the information and the command to the power supply apparatus 100. When the electronic apparatus 200 performs the load modulation, a current flowing through the power supply antenna 108 is changed. Thus, the modem circuit 106 can receive at least one of the information and the command from the electronic apparatus 200 by detecting the current flowing through the power supply antenna 108.

The timer 107 measures at least one of the current time and a time period relating to an operation performed in each unit. A threshold value for the timer 107 is previously recorded in the ROM 109.

The power supply antenna 108 is an antenna for transmitting the power generated by the power transmission circuit 102 to the electronic apparatus 200.

The ROM 109 stores a computer program for controlling the power supply apparatus 100 and information such as a parameter relating to the operation of the power supply apparatus 100.

The RAM 110 temporarily records the information such as the parameter relating to the operation of the power supply apparatus 100 and the information received from the electronic apparatus 200 by the modem circuit 106.

The conversion unit 111 converts the AC power supplied from the AC power source (not illustrated) into the DC power and supplies the converted DC power to each of the units in the power supply apparatus 100 when the AC power source (not illustrated) and the power supply apparatus 100 are connected to each other.

(Electronic Apparatus 200)

The electronic apparatus 200 will be described below with reference to FIG. 2. The electronic apparatus 200 includes the power receiving antenna 201, a matching circuit 202, a rectifying and smoothing circuit 203, a modem circuit 204, a control unit 205, a ROM 206, a RAM 207, a regulator 208, a charging control unit 209, a battery 210, and a timer 211. Further, the electronic apparatus 200 includes a power receiving restriction circuit 212, an imaging unit 213, a recording unit 214, an operation unit 215, and a state detection unit 216.

The power receiving antenna 201 is an antenna for receiving the power supplied from the power supply apparatus 100.

The matching circuit 202 is a resonance circuit for performing impedance matching so that the power receiving antenna 201 resonates at a frequency corresponding to the resonant frequency f of the power supply apparatus 100. The matching circuit 202 includes a variable capacitor, a variable coil, and a variable resistor. The control unit 205 controls values of at least one of the variable capacitor and the variable coil in the matching circuit 202 so that the power receiving antenna 201 resonates at a frequency corresponding to the resonant frequency f of the power supply apparatus 100.

The rectifying and smoothing circuit 203 removes a command and noise from the power received by the power receiving antenna 201, to generate DC power to be supplied to a predetermined load. The predetermined load includes at least one of the charging control unit 209, the battery 210, the operation unit 215, the imaging unit 213, and the recording unit 214, for example. Further, the rectifying and smoothing circuit 203 supplies the generated DC power to the predetermined load via the regulator 208. The rectifying and smoothing circuit 203 supplies the command removed from the power received from the power receiving antenna 201 to the modem circuit 204.

The modem circuit 204 analyzes the command supplied from the rectifying and smoothing circuit 203 according to the power supply apparatus 100 and the predetermined communication protocol, and supplies an analysis result of the command to the control unit 205.

The control unit 205 executes the computer program stored in the ROM 206, to control the operation of the electronic apparatus 200. The control unit 205 is a CPU, for example. The control unit 205 is constituted by hardware devices.

The control unit 205 determines the command received by the modem circuit 204 according to the analysis result supplied from the modem circuit 204, and performs process designated by the received command. The modem circuit 204 performs load modulation to transmit a response corresponding to the command received from the power supply apparatus 100 to the power supply apparatus 100 in response to an instruction from the control unit 205.

The ROM 206 stores a computer program for controlling the operation of the electronic apparatus 200 and information such as a parameter relating to the operation of the electronic apparatus 200.

The ROM 206 records identification information of the electronic apparatus 200 and power receiving capability information of the electronic apparatus 200. The identification information of the electronic apparatus 200 includes information indicating an identification ID, a manufacturer name, an apparatus name, and a date of manufacture of the electronic apparatus 200, for example. A unit for receiving power wirelessly transmitted from the power supply apparatus 100 is hereinafter referred to as a "power receiving unit". The power receiving unit includes at least the power receiving antenna 201. The power receiving unit may further include the matching circuit 202, the rectifying and smoothing circuit 203, and the modem circuit 204 in addition to the power receiving antenna 201.

The power receiving capability information of the electronic apparatus 200 includes information indicating a maximum value of the power that can be received by the electronic apparatus 200 and information indicating a minimum value of the power that can be received by the electronic apparatus 200, for example. Further, the power receiving capability information of the electronic apparatus 200 may include information indicating whether the electronic apparatus 200 includes a means for receiving the power wirelessly transmitted from the power supply apparatus 100.

The RAM 207 temporarily records the information such as the parameter relating to the operation of the electronic apparatus 200 and the information received from the power supply apparatus 100 by the electronic apparatus 200.

The regulator 208 converts a voltage of the DC power supplied from at least one of the battery 210 and the external power source (not illustrated) in response to instructions from the rectifying and smoothing circuit 203 and the control unit 205, and supplies the converted voltage to each of the units in the electronic apparatus 200.

The charging control unit 209 charges the battery 210 when the DC power is supplied thereto from the regulator 208. The charging control unit 209 periodically detects information indicating a remaining capacity of the battery 210 connected to the electronic apparatus 200, and supplies the detected information to the control unit 205. The control unit 205 records information indicating the remaining capacity (referred to as remaining capacity information) of the battery 210 supplied from the charging control unit 209 on the RAM 207.

The battery 210 is a secondary battery connectable to the electronic apparatus 200.

The timer 211 measures at least one of the current time and a time period relating to an operation performed in each of the units. A threshold value for the timer 211 is previously recorded in the ROM 206.

The power receiving restriction circuit 212 can control a value of the power received from the power supply apparatus 100 via the power receiving antenna 201 in response to an instruction from the control unit 205. The control unit 205 controls the power receiving restriction circuit 212 in response to a detection result of the state detection unit 216.

The imaging unit 213 generates at least one of video data of a still image and a moving image from a subject, and supplies the generated video data to the recording unit 214.

The recording unit 214 stores the video data supplied from the imaging unit 213 in a recording medium 214a connectable to the electronic apparatus 200.

The operation unit 215 is a user interface for causing the electronic apparatus 200 to perform a desired operation.

The state detection unit 216 detects a state of the electronic apparatus 200, and supplies data indicating the detected state of the electronic apparatus 200 to the control unit 205. The control unit 205 controls the electronic apparatus 200 in response to the data supplied from the state detection unit 216.

The state detection unit 216 detects a temperature of the electronic apparatus 200, a current flowing through the battery 210 connected to the electronic apparatus 200, and a voltage of the battery 210 connected to the electronic apparatus 200 as the state of the electronic apparatus 200.

The control unit 205 determines that the electronic apparatus 200 is in a first state when the temperature, which has been detected by the state detection unit 216, is a first threshold value or more and less than a second threshold value. When the electronic apparatus 200 is in the first state, the control unit 205 requests the power supply apparatus 100 to restrict the power supplied to the electronic apparatus 200 by the power supply apparatus 100 without controlling the power receiving restriction circuit 212. The control unit 205 determines that the electronic apparatus 200 is in a second state when the temperature, which has been detected by the state detection unit 216, is the second threshold value or more. The second threshold is a value more than the first threshold value. The second state is a state where excess power is supplied to the electronic apparatus 200 from the power supply apparatus 100. When the electronic apparatus 200 is in the second state, the control unit 205 controls the power receiving restriction circuit 212, to restrict the power to be received by the electronic apparatus 200 from the power supply apparatus 100.

The control unit 205 determines that the electronic apparatus 200 is in a third state when the voltage of the battery 210, which has been detected by the state detection unit 216, is a predetermined voltage value or more. The control unit 205 determines that the electronic apparatus 200 is in the third state when the current flowing through the battery 210, which has been detected by the state detection unit 216, is a predetermined current value or less. The third state is a state where the electronic apparatus 200 cannot charge the battery 210. When the electronic apparatus 200 is in the third state, the control unit 205 controls the power receiving restriction circuit 212, to restrict the power to be received by the electronic apparatus 200 from the power supply apparatus 100.

While in the first exemplary embodiment, the power supply apparatus 100 wirelessly transmits the power to the electronic apparatus 200, and the electronic apparatus 200 wirelessly receives the power from the power supply apparatus 100, "wireless" may be reworded to "non-contact" or "contactless".

(Power Supplying Process)

In the first exemplary embodiment, power supplying process performed by the power supply apparatus 100 will be described with reference to a flowchart of FIG. 3. The power supplying process illustrated in FIG. 3 can be implemented when the control unit 105 executes the computer program stored in the ROM 109. The power supplying process will be described below using a case where the power supply apparatus 100 performs power supplying to the electronic apparatus 200, as an example.

In step S301, the control unit 105 determines whether the electronic apparatus 200 has been detected within a predetermined area. The control unit 105 outputs a faint signal from the power supply antenna 108, and determines whether the electronic apparatus 200 has been detected depending on the presence or absence of a response from the electronic apparatus 200. If it is determined that the electronic apparatus 200 has not been detected within the predetermined area (NO in step S301), the process returns to step S301. If it is determined that the electronic apparatus 200 has been detected within the predetermined area (YES in step S301), the process proceeds from step S301 to step S302.

In step S302, the control unit 105 transmits an authentication request to the electronic apparatus 200 that has been detected in step S301. The control unit 105 controls the modem circuit 106 to transmit an authentication request command to request authentication of the electronic apparatus 200 to the electronic apparatus 200. After the authentication request command has been transmitted, the process proceeds from step S302 to step S303.

When the electronic apparatus 200 normally receives the authentication request command from the power supply apparatus 100, the electronic apparatus 200 transmits an authentication response signal generated by the control unit 205 to the power supply apparatus 100 via the modem circuit 204.

In step S303, the control unit 105 determines whether the modem circuit 106 has received the authentication response signal from the electronic apparatus 200 as a response to the authentication request command. The authentication response signal includes identification information of the electronic apparatus 200 and power receiving capability information of the electronic apparatus 200. If the modem circuit 106 does not receive the authentication response signal from the electronic apparatus 200 (NO in step S303), the process returns to step S303. If the modem circuit 106 receives the authentication response signal from the electronic apparatus 200 (YES in step S303), the process proceeds from step S303 to step S304.

In step S304, the control unit 105 outputs power required for the electronic apparatus 200 until a predetermined time period elapses. The control unit 105 sets the power required for the electronic apparatus 200 in response to the information received from the electronic apparatus 200. After the predetermined time period has elapsed, the process proceeds from step S304 to step S305.

In step S305, the control unit 105 determines whether a voltage standing wave ratio detected using the matching detection circuit 103 is a predetermined value or more. If the voltage standing wave ratio is the predetermined value or more (YES in step S305), the process proceeds from step S305 to S310. If the voltage standing wave ratio is not the predetermined value or more (NO in step S305), the process proceeds from step S305 to step S306.

In step S306, the control unit 105 restricts the power supplied to the electronic apparatus 200 via the power supply antenna 108. Then, the power supplied to the electronic apparatus 200 via the power supply antenna 108 decreases, and the modem circuit 106 can communicate with the electronic apparatus 200. In this case, the process proceeds from step S306 to step S307.

In step S307, the control unit 105 transmits a status request command to request status information of the electronic apparatus 200 of the electronic apparatus 200. The status information of the electronic apparatus 200 includes information indicating whether the electronic apparatus 200 is in a chargeable state, remaining capacity information (for example residual capacity information), and information indicating power that the electronic apparatus 200 requests of the power supply apparatus 100, for example. Further, the status information of the electronic apparatus 200 may include information relating to the electronic apparatus 200. The information relating to the electronic apparatus 200 may include information indicating an operating state of the electronic apparatus 200 and information indicating power consumed by the electronic apparatus 200, for example. The status request command is used to inquire whether the electronic apparatus 200 is in a chargeable state. After the status request command has been transmitted, the process proceeds from step S307 to step S308.

In step S308, the control unit 105 determines whether the modem circuit 106 has received the status information from the electronic apparatus 200 as a response to the status request command. If the modem circuit 106 has not received the status information (NO in step S308), the process returns to step S308. If the modem circuit 106 has received the status information (YES in step S308), the process proceeds from step S308 to step S309.

In step S309, the control unit 105 determines whether power supplying to the electronic apparatus 200 is continuously performed based on the status information received from the electronic apparatus 200. If it is determined that the power supplying to the electronic apparatus 200 is continuously performed (YES in step S309), the process returns from step S309 to step S304. If it is determined that the power supplying to the electronic apparatus 200 is not continuously performed (NO in step S309), the process ends.

In step S310, the control unit 105 performs similar process to that in step S306. In this case, the process ends.

Figure 3:
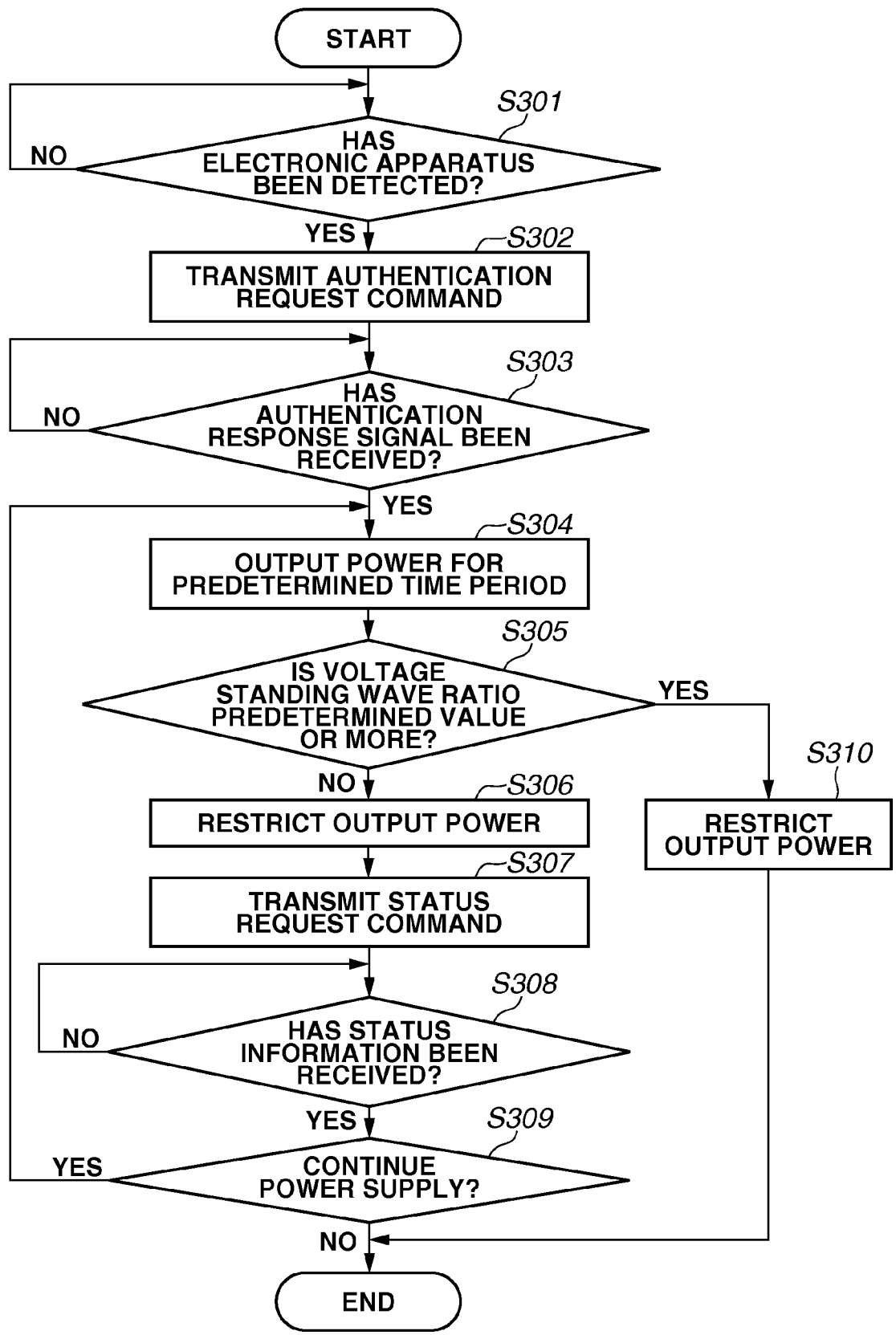
FIG. 3 is a flowchart illustrating an example of a power supplying process of the power supply apparatus according to the first exemplary embodiment.

Even if the power supplying process illustrated in FIG. 3 ends, the power supply apparatus 100 may repeatedly perform the power supplying process illustrated in FIG. 3.

The control unit 105 detects whether the voltage standing wave ratio detected by the matching detection unit 103 is the predetermined value or more in step S305. However, the present invention is not limited to this. For example, in step S305, the control unit 105 may detect whether a voltage of a reflection wave detected by the matching detection circuit 103 exceeds a predetermined voltage value instead of the voltage standing wave ratio. In this case, if the voltage of the reflection wave detected by the matching detection circuit 103 is the predetermined voltage value or more (YES in step S305), the process proceeds from step S305 to step S310. In this case, if the voltage of the reflection wave detected by the matching detection circuit 103 is not the predetermined voltage value or more (NO in step S305), the process proceeds from step S305 to step S306.

The control unit 105 detects whether the voltage standing wave ratio detected by the matching detection circuit 103 exceeds the predetermined value in step S305. However, the present invention is not limited to this. For example, in step S305, the control unit 105 may detect whether a voltage of a traveling wave detected by the matching detection circuit 103 is a predetermined voltage value or more instead of the voltage standing wave ratio. In this case, if the voltage of the traveling wave detected by the matching detection circuit 103 is the predetermined voltage value or more (YES in step S305), the process proceeds from step S305 to step S310. In this case, if the voltage of the traveling wave detected by the matching detection circuit 103 is not the predetermined voltage value or more (NO in step S305), the process proceeds from step S305 to step S306.

(Power Receiving Process)

Power receiving process according to the first exemplary embodiment performed by the electronic apparatus 200 will be described with reference to a flowchart of FIG. 4. The power receiving process illustrated in FIG. 4 can be implemented when the control unit 205 executes the computer program stored in the ROM 206. The power receiving process will be described below using a case where the electronic apparatus 200 receives the power from the power supply apparatus 100, as an example.

In step S401, the control unit 205 determines whether the modem circuit 204 has received an authentication request command from the power supply apparatus 100. If the modem circuit 204 has not received the authentication request command from the power supply apparatus 100 (NO in step S401), the process returns to step S401. If the modem circuit 204 has received the authentication request command from the power supply apparatus 100 (YES in step S401), the process proceeds from step S401 to S402.

In step S402, the control unit 205 controls the modem circuit 204 to transmit the authentication response signal to the power supply apparatus 100. In this case, the process proceeds from step S402 to S403.

In step S403, the control unit 205 controls the regulator 208 such that the electronic apparatus 200 starts to receive power output from the power supply apparatus 100 and the power supplied from the rectifying and smoothing circuit 203 is supplied to the predetermined load in the electronic apparatus 200. In this case, the process proceeds from step S403 to step S404.

In step S404, the control unit 205 performs a first detection process to confirm the state of the electronic apparatus 200. The first detection process will be described below. In this case, the process proceeds from step S404 to S405. When the first detection process is performed, a power receiving restriction flag for indicating that the power to be received from the power receiving apparatus 100 by the electronic apparatus 200 is restricted may be set depending on the state of the electronic apparatus 200.

In step S405, the control unit 205 determines whether the power receiving restriction flag has been set based on a result of the first detection process that has been performed in step S404. If the power receiving restriction flag has been set as the result of the first detection process (YES in step S405), the process proceeds from step S405 to S411. If the power receiving restriction flag has not been set as the result of the first detection process (NO in step S405), the process proceeds from step S405 to step S406.

In step S406, the control unit 205 performs a second detection process to confirm the state of the electronic apparatus 200. The second detection process will be described below. In this case, the process proceeds from step S406 to step S407. If the second detection process has been performed, it is possible that the power receiving restriction flag is set depending on the state of the electronic apparatus 200.

In step S407, the control unit 205 determines whether the power receiving restriction flag has been set based on a result of the second detection process that has been performed in step S406. If the power receiving restriction flag has been set as the result of the second detection process (YES in step S407), the process proceeds from step S407 to step S411. If the power receiving restriction flag has not been set as the result of the second detection process (NO in step S407), the process proceeds from step S407 to step S408.

In step S408, the control unit 205 determines whether the modem circuit 204 has received the status request command from the power supply apparatus 100. If the modem circuit 204 has not received the status request command (NO in step S408), the process returns from step S408 to step S404. If the modem circuit 204 has received the status request command (YES in step S408), the process proceeds from step S408 to step S409.

In step S409, the control unit 205 controls the modem circuit 204 to transmit the status information to the power supply apparatus 100. In this case, the process proceeds from step S409 to step S410.

In step S410, the control unit 205 determines whether the battery 210 is being charged. If it is detected that the battery 210 has been fully charged, the control unit 205 determines that the battery 210 is not being charged (NO in step S410). If the battery 210 is not being charged (NO in step S410), the process ends. If it is not detected that the battery 210 has been fully charged, the control unit 205 determines that the battery 210 is being charged (YES in step S410). If the battery 210 is being charged (YES in step S410), the process returns from step S410 to step S404.

In step S411, the control unit 205 performs power receiving restriction process for restricting the power which the electronic apparatus 200 receives from the power supply apparatus 100 using the power receiving restriction circuit 212. The power receiving restriction circuit 212 will be described with reference to FIG. 7.

Figure 7A:
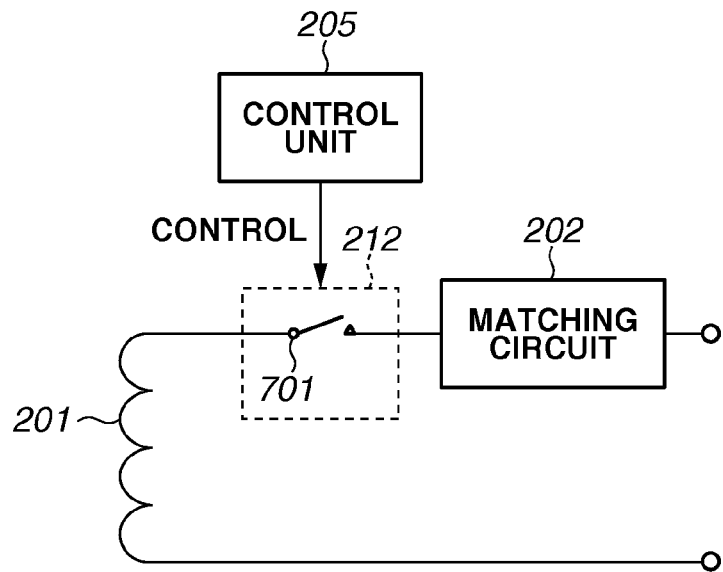
FIGS. 7A and 7B respectively illustrate examples of a power receiving restriction circuit in the first exemplary embodiment.

If the power receiving restriction circuit 212 is a circuit as illustrated in FIG. 7A, the power receiving restriction circuit 212 is connected in series between the power receiving antenna 201 and the matching circuit 202. In this case, the power receiving restriction circuit 212 includes a switch 701. Further, the switch 701 is provided between the power receiving antenna 201 and the matching circuit 202. The control unit 205 connects the power receiving antenna 201 and the matching circuit 202 by turning on the switch 701. The control unit 205 can disconnect the power receiving antenna 201 from the matching circuit 202 by turning off the switch 701. If the power receiving restriction circuit 212 is the circuit as illustrated in FIG. 7A, the control unit 205 performs a process for turning off the switch 701 as the power receiving restriction process in step S411. If the power receiving restriction circuit 212 is the circuit illustrated in FIG. 7A, the control unit 205 performs a process for tuning on the switch 701, and then performs the power receiving process illustrated in FIG. 4. Therefore, if the switch 701 is changed from ON to OFF in step S411, the power supplied to the matching circuit 202 via the power receiving antenna 201 decreases.

Figure 7B:
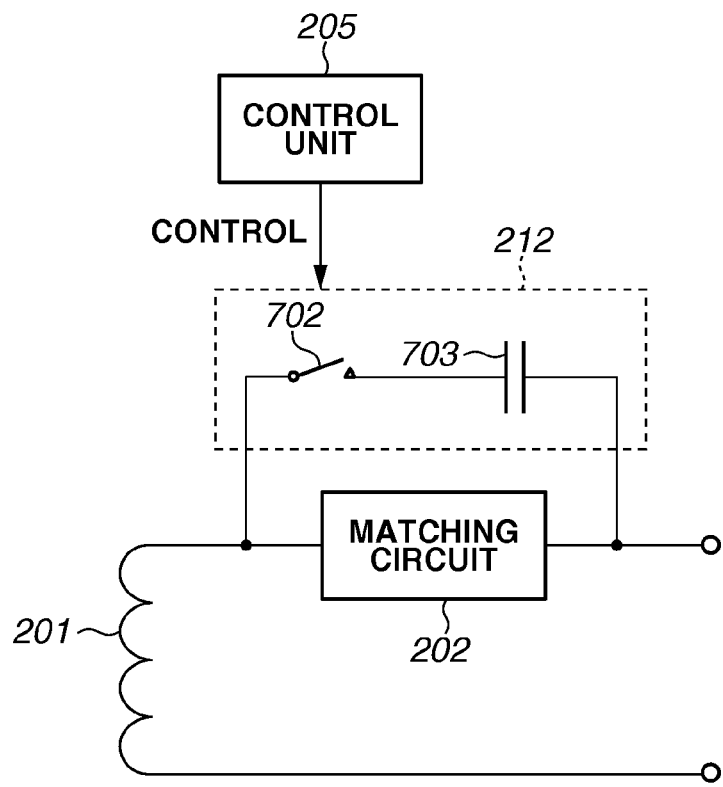

If the power receiving restriction circuit 212 is a circuit illustrated in FIG. 7B, the power receiving restriction circuit 212 is connected in parallel with the matching circuit 202. In this case, the power receiving restriction circuit 212 includes a switch 702 and a capacitor 703. Further, the switch 702 is provided between the power receiving antenna 201 and the capacitor 703. The control unit 205 connects the power receiving antenna 201 and the capacitor 703 by turning on the switch 702. The control unit 205 disconnects the power receiving antenna 201 from the capacitor 803 by turning off the switch 702. The control unit 205 controls the switch 702, to change a reactance of the power receiving restriction circuit 212. If the power receiving restriction circuit 212 is the circuit as illustrated in FIG. 7B, the control unit 205 performs a process for turning on the switch 702 as the power receiving restriction process in step S411. If the power receiving restriction circuit 212 is the circuit as illustrated in FIG. 7B, the control unit 205 performs a process for turning off the switch 702, and then controls the matching circuit 202 so that the power receiving antenna 201 resonates at a frequency corresponding to the resonant frequency f of the power supply apparatus 100. Then, the control unit 205 performs the power receiving process illustrated in FIG. 4. Therefore, if the switch 702 is changed from OFF to ON in step S411, the reactance of the power receiving restriction circuit 212 is changed so that the resonant frequency of the power receiving antenna 201 is changed to a different frequency from the resonant frequency f of the power supply antenna 108. Thus, coupling between the power supply antenna 108 and the power receiving antenna 201 is weakened. Therefore, the power supplied from the power receiving antenna 201 to the matching circuit 202 decreases.

After the power receiving restriction process has been performed, the process proceeds from step S411 to step S412.

The power supplied from the power receiving antenna 201 to the rectifying and smoothing circuit 203 decreases after the power receiving restriction process has been performed in step S411. Thus, the electronic apparatus 200 can restrict the power received from the power supply apparatus 100.

In step S412, the control unit 205 performs a return process for returning the power receiving restriction circuit 212 to a state where the process in step S411 has not yet been performed. The return process will be described below. In this case, the power receiving restriction flag is unset, and the process ends.

Figure 4:
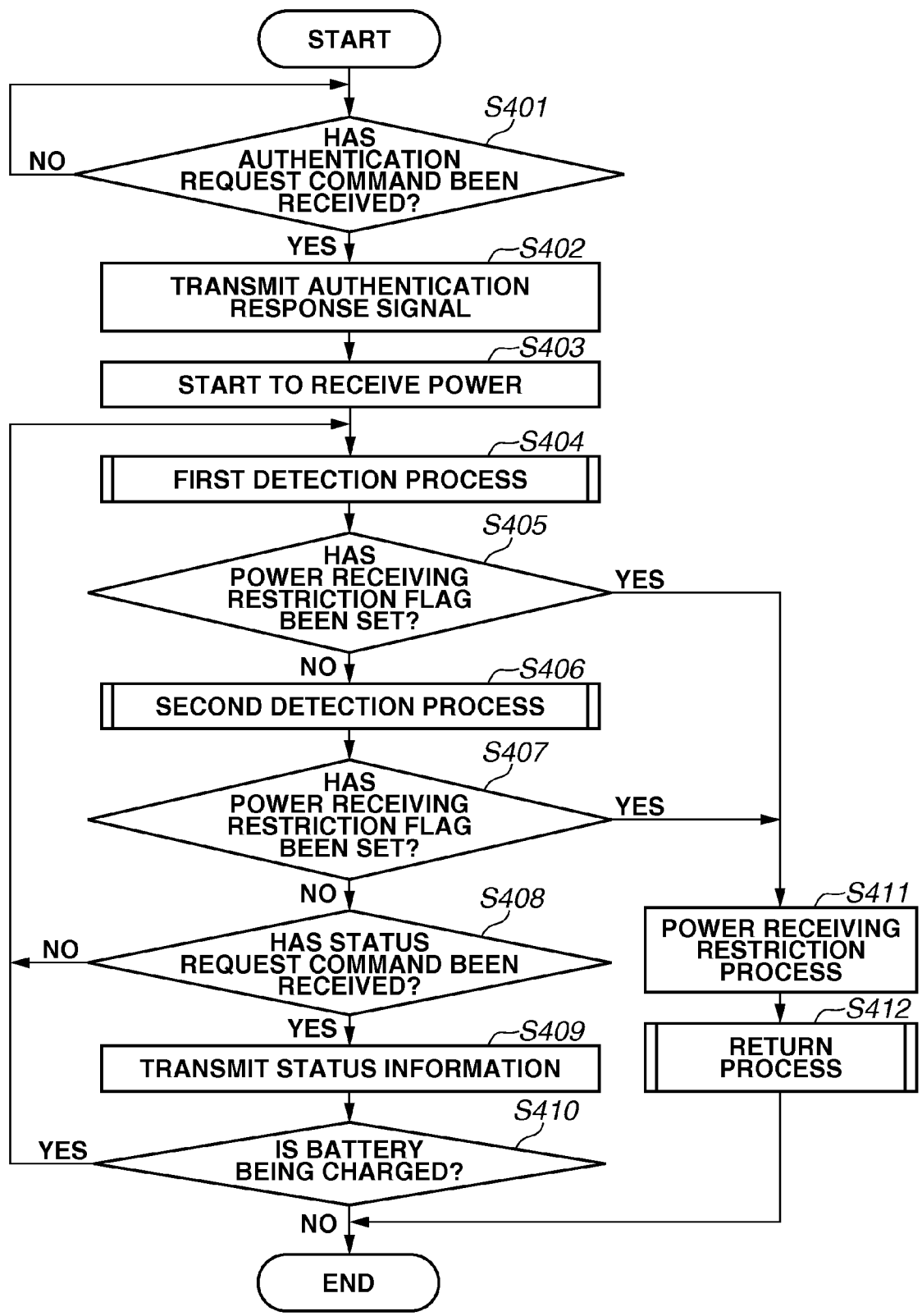
FIG. 4 is a flowchart illustrating an example of a power receiving process of an electronic apparatus according to the first exemplary embodiment.

Even if the power receiving process illustrated in FIG. 4 ends, the electronic apparatus 200 may repeatedly perform the power receiving process illustrated in FIG. 4.

(First Detection Process)

The first detection process performed by the control unit 205 in step S404 in the power receiving process illustrated in FIG. 4 will be described with reference to a flowchart of FIG. 5. The first detection process illustrated in FIG. 5 can be implemented when the control unit 205 executes the computer program stored in the ROM 206.

In step S501, the control unit 205 causes the state detection unit 216 to detect the temperature. In step S501, the temperature, which has been detected by the state detection unit 216, may be a temperature in the vicinity of the power receiving antenna 201, in the vicinity of the control unit 205, or in the vicinity of the charging control unit 209, for example. In step S501, the temperature, which has been detected by the state detection unit 216, may be a temperature in the vicinity of the battery 210. If the state detection unit 216 has detected the temperature, the process proceeds from step S501 to S502.

In step S502, the control unit 205 determines whether the temperature, which has been detected by the state detection unit 216 in step S501, is a first threshold value or more. The threshold value is a temperature above a normal temperature of the circuit in the electronic apparatus 200, and is set such that within a limit where the electronic apparatus 200 can safely operate, a temperature margin is set. If the temperature, which has been detected by the state detection unit 216, is the first threshold value or more (YES in step S502), the process proceeds from step S502 to S503. If the temperature, which has been detected by the state detection unit 216, is less than the first threshold value (NO in step S502), the process ends.

In step S503, the control unit 205 determines whether the temperature, which has been detected by the state detection unit 216, is a second threshold value or more. The control unit 205 determines whether the temperature, which has been detected by the state detection unit 216 in step S501, is the second threshold value or more. The second threshold value is a temperature within a limit where the electronic apparatus 200 can safely operate. If the temperature, which has been detected by the state detection unit 216, is the second threshold value or more (YES in step S503), the process proceeds from step S503 to S504. If the temperature, which has been detected by the state detection unit 216, is less than the second threshold value (NO in step S503), the process proceeds from step S503 to S505.

In step S504, the control unit 205 sets the power receiving restriction flag in the RAM 207. In this case, the process ends.

In step S505, the control unit 205 controls the modem circuit 204 to transmit a power supplying restriction request to request the power supply apparatus 100 to restrict the power output to the electronic apparatus from the power supply apparatus 100 to the power supply apparatus 100. Then, the process proceeds from step S505 to step S506. If the power supply apparatus 100 normally receives the power supplying restriction request from the electronic apparatus 200, the power output to the electronic apparatus 200 is reduced, or the output of the power to the electronic apparatus 200 is stopped.

In step S506, the control unit 205 determines whether the received power is a predetermined power value or less. The received power is power which the electronic apparatus 200 has received from the power supply apparatus 100 via the power receiving antenna 201. For example, the control unit 205 compares the DC power generated by the rectifying and smoothing circuit 203 with the predetermined power value as the received power. If the received power is the predetermined power value or less (YES in step S506), the process ends. If the received power is not the predetermined power value or less (NO in step S506), the process proceeds from step S506 to step S504.

The control unit 205 controls the modem circuit 204 to transmit the power supplying restriction request to the power supply apparatus 100 in step S505. However, the present invention is not limited to this. For example, in step S505, the control unit 205 may control the modem circuit 204 to transmit a power supplying stop request to request the power supply apparatus 100 to stop outputting the power to the electronic apparatus 200 from the power supply apparatus 100 instead of the power supplying restriction request to the power supply apparatus 100.

(Second Detection Process)

The second detection process performed by the control unit 205 in step S406 in the power receiving process illustrated in FIG. 4 will be described with reference to a flowchart of FIG. 6. The second detection process illustrated in FIG. 6 can be implemented when the control unit 205 executes the computer program stored in the ROM 206.

In step S601, the control unit 205 determines whether the voltage of the battery 210, which has been detected by the state detection unit 216, is a predetermined voltage or more. If the voltage of the battery 210, which has been detected by the state detection unit 216, is the predetermined voltage or more (YES in step S601), the process proceeds from step S601 to step S603. If the voltage of the battery 210, which has been detected by the state detection unit 216, is not the predetermined voltage or more (NO in step S601), the process proceeds from step S601 to step S602.

In step S602, the control unit 205 determines whether the current flowing through the battery 210, which has been detected by the state detection unit 216, is a predetermined current or less. If the current flowing through the battery 210, which has been detected by the state detection unit 216, is the predetermined current or less (YES in step S602), the process proceeds from step S602 to step S603. If the current flowing through the battery 210, which has been detected by the state detection unit 216, is not the predetermined current or less (NO in step S602), the process ends.

(Return Process)

The return process performed by the control unit 205 in step S412 in the power receiving process illustrated in FIG. 4 will be described with reference to a flowchart of FIG. 8. The return process illustrated in FIG. 8 can be implemented when the control unit 205 executes the computer program stored in the ROM 206.

In step S801, the control unit 205 determines whether the electronic apparatus 200 is in a first state. If the control unit 205 determines that the electronic apparatus 200 is in the first state (YES in step S801), the process proceeds from step S801 to S805. If the control unit 205 determines that the electronic apparatus 200 is not in the first state (NO in step S801), the process proceeds from step S801 to S802.

In step S802, the control unit 205 determines whether the electronic apparatus 200 is in a second state. If the control unit 205 determines that the electronic apparatus 200 is in the second state (YES in step S802), the process proceeds from step S802 to step S805. If the control unit 205 determines that the electronic apparatus 200 is not in the second state (NO in step S802), the process proceeds from step S802 to step S803.

In step S803, the control unit 205 determines whether the electronic apparatus 200 is in a third state. If the control unit 205 determines that the electronic apparatus 200 is in the third state (YES in step S803), the process proceeds from step S803 to step S805. If the control unit 205 determines that the electronic apparatus 200 is not in the third state (NO in step S803), the process proceeds from step S803 to step S804.

In step S804, the control unit 205 cancels the power receiving restriction process that has been performed in step S411.

If the power receiving restriction circuit 212 is the circuit as illustrated in FIG. 7A, the control unit 205 performs process for tuning on the switch 701 to cancel the power receiving restriction process.

If the power receiving restriction circuit 212 is the circuit as illustrated in FIG. 7B, the control unit 205 performs process for tuning off the switch 702 to cancel the power receiving restriction process. If the power receiving restriction process has been canceled, the process ends.

In step S805, the control unit 205 measures a predetermined time period using the timer 211. Further, the control unit 205 waits until the predetermined time period elapses. The predetermined time period is a time period that is presumed to elapse until the electronic apparatus 200 is in none of the first state, the second state, and the third state. If a measurement result of the timer 211 shows that the predetermined time period has elapsed, the process proceeds from step S805 to step S806.

In step S806, the control unit 205 cancels the power receiving restriction process that has been performed in step S411, similar to step S804. Then, the process proceeds from step S806 to step S807.

In step S807, the control unit 205 determines whether the received power is a predetermined power value or less, similar to step S506. If the received power is the predetermined power value or less (YES in step S807), the process ends. If the received power is not the predetermined power value or less (NO in step S807), the process proceeds from step S807 to step S808.

In step S808, the control unit 205 performs power receiving restriction process, similar to step S411. After the power receiving restriction process has been performed, the process returns from step S808 to step S801.

Thus, the electronic apparatus 200 according to the first exemplary embodiment determines whether the electronic apparatus 200 is in at least one of the first state, the second state, and the third state, and performs control to determine whether it receives power from the power supply apparatus 100 in response to a determination result. If the electronic apparatus 200 is in at least one of the first state, the second state, and the third state, the electronic apparatus controls the power receiving restriction circuit 212 to restrict the receiving of the power output from the power supply apparatus 100.

Thus, even if the electronic apparatus 200 transmits the power supplying restriction request to the power supply apparatus 100, if the power supply apparatus 100 does not restrict the power supplying to the electronic apparatus 200 (NO in step S503), the electronic apparatus 200 can restrict the receiving of the power output from the power supply apparatus 100.

Thus, even if the temperature, which has been detected by the electronic apparatus 200, is the second threshold value or more (YES in step S503), the electronic apparatus 200 can restrict the receiving of the power output from the power supply apparatus 100.

Thus, if the voltage of the battery 210 is equal to or more than the predetermined voltage (YES in step S601), the electronic apparatus 200 can restrict the receiving of the power output from the power supply apparatus 100.

Thus, if the current flowing through the battery 210 is the predetermined current or less (YES in step S602), the electronic apparatus 200 can restrict the receiving of the power output from the power supply apparatus 100.

Therefore, the electronic apparatus 200 according to the first exemplary embodiment can avoid receiving of the power output from the power supply apparatus 100 depending on the state of the electronic apparatus 200, and thus can prevent the power output from the power supply apparatus 100 from being uselessly consumed.

In a second exemplary embodiment, description of processes and components common to those described in the first exemplary embodiment are not repeated, and different processes and components from those described in the first exemplary embodiment will be described.

Figure 9:
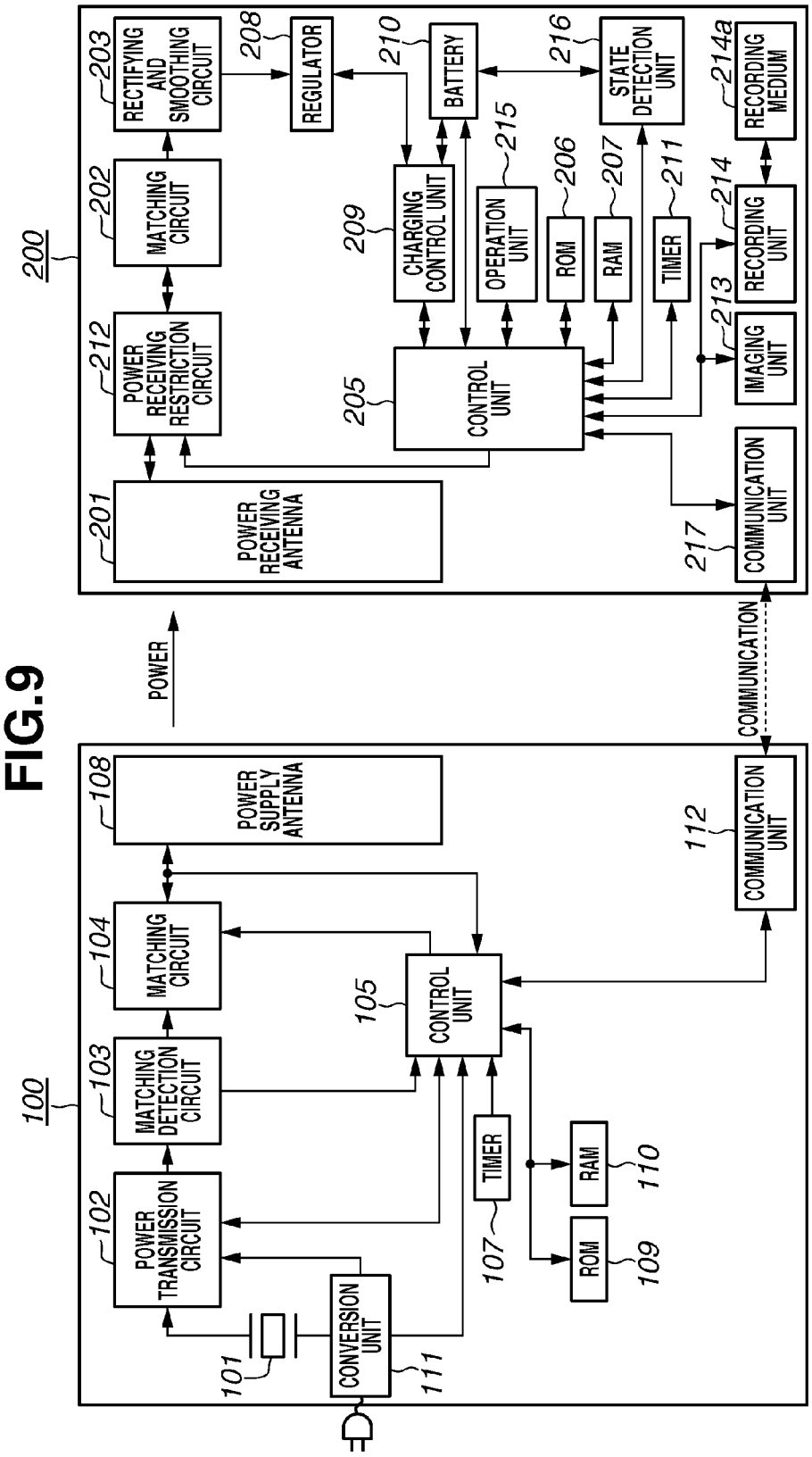
FIG. 9 is a block diagram illustrating an example of a power supplying system according to a second exemplary embodiment.

FIG. 9 illustrates an example of a block diagram of a power supplying system according to the second exemplary embodiment.

In the first exemplary embodiment, the power supply apparatus 100 uses the modem circuit 106 to communicate with the electronic apparatus 200. However, a power supply apparatus 100 according to the second exemplary embodiment uses a communication unit 112 instead of the modem circuit 106 to communicate with an electronic apparatus 200.

The electronic apparatus 200 according to the second exemplary embodiment uses a communication unit 217 instead of the modem circuit 204 to communicate with the power supply apparatus 100.

The communication unit 112 may perform communication that is different from a communication using the modem circuit 106, with the electronic apparatus 200. Further, the communication unit 217 may also similarly perform communication that is different from a communication using the modem circuit 204, with the electronic apparatus 200.

Therefore, the communication unit 112 and the communication unit 217 may perform communication compatible with Wireless Local Area Network (LAN), Blue Tooth, and Transfer Jet.

Figure 5:
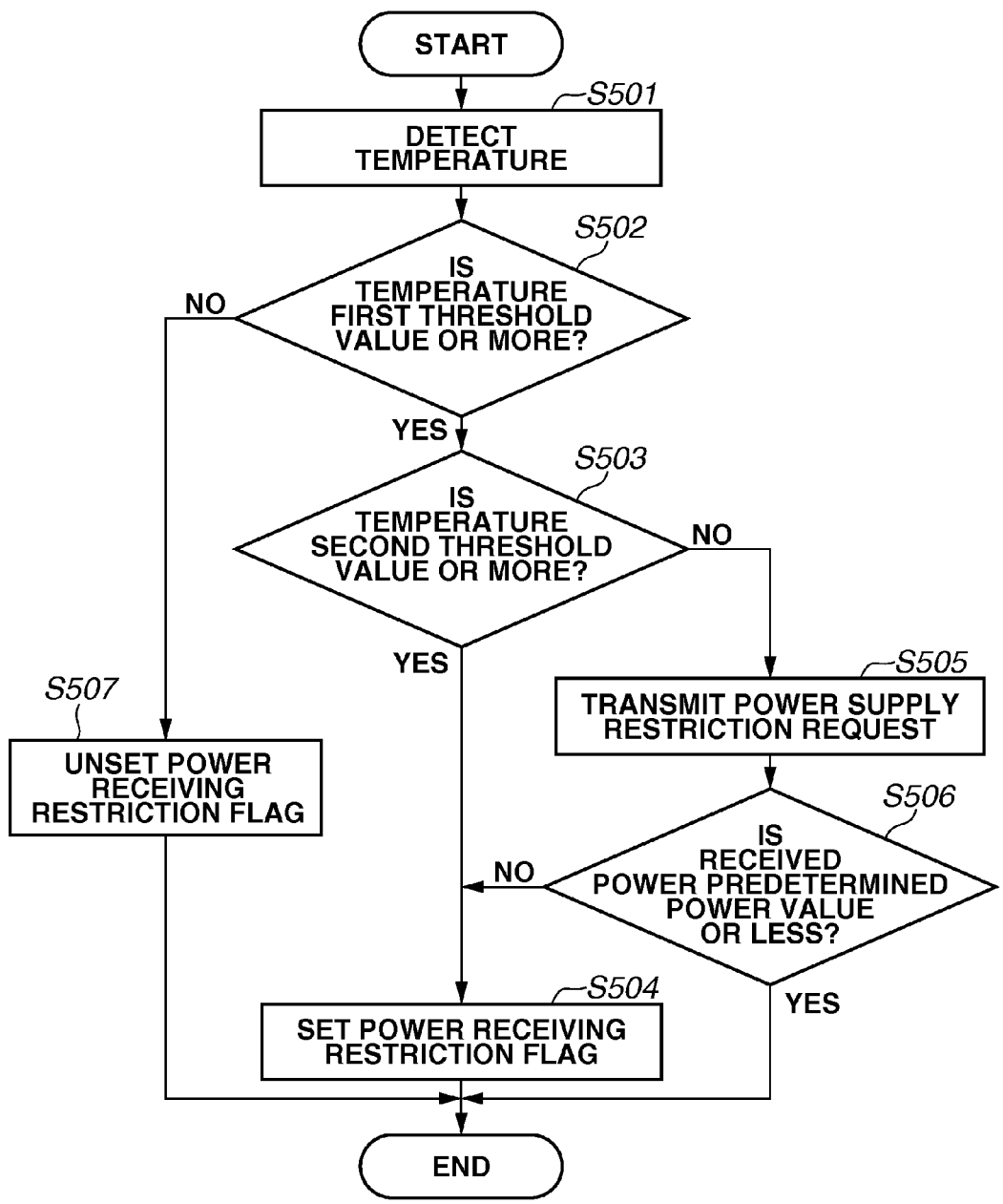
FIG. 5 is a flowchart illustrating an example of a first detection process of the electronic apparatus according to the first exemplary embodiment.
Figure 6:
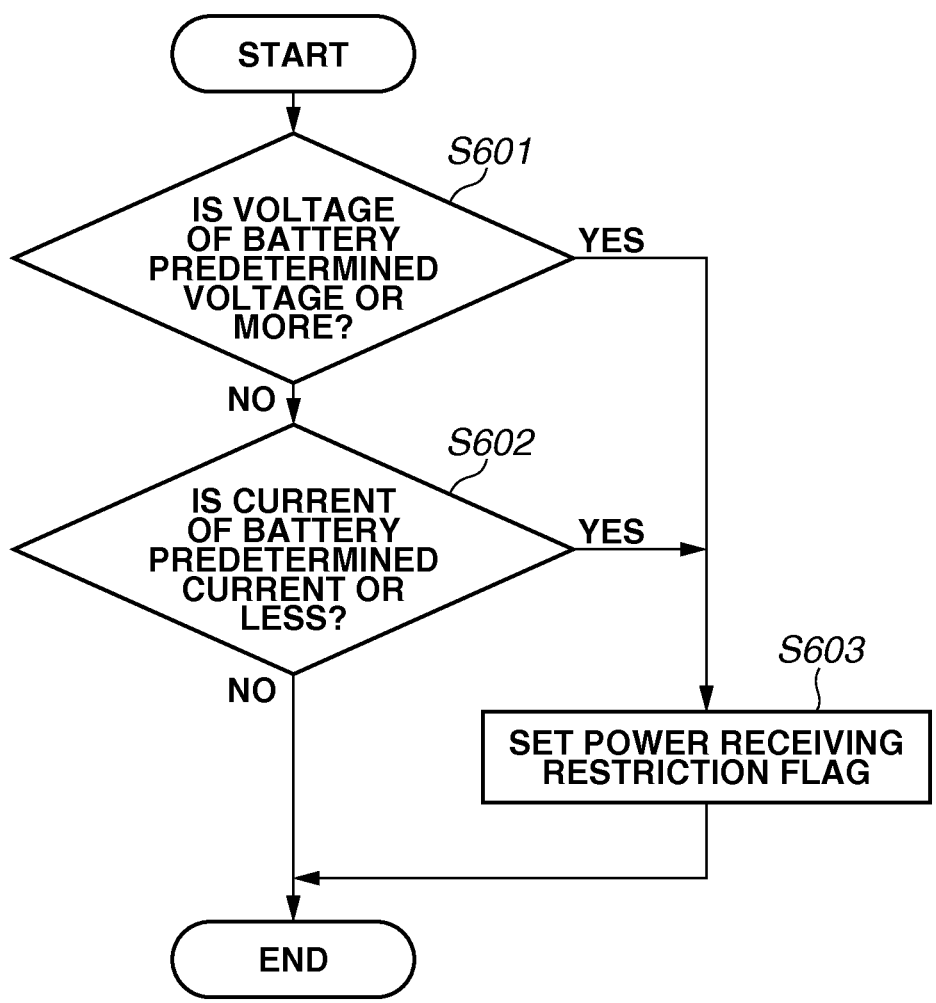
FIG. 6 is a flowchart illustrating an example of a second detection process of the electronic apparatus according to the first exemplary embodiment.

In the electronic apparatus 200 according to the second exemplary embodiment, the power receiving process illustrated in FIG. 4, the first detection process illustrated in FIG. 5, and the second detection process illustrated in FIG. 6 are performed, similar to the first exemplary embodiment. However, in the power receiving process illustrated in FIG. 4, the communication unit 217 is used instead of the modem circuit 204 to receive an authentication request command and a status request command from the power supply apparatus 100. Further, in the power receiving process illustrated in FIG. 4, the communication unit 217 is used instead of the modem circuit 204 to transmit an authentication response signal and status information to the power supply apparatus 100.

In the first detection process illustrated in FIG. 5, the communication unit 217 is used instead of the modem circuit 204 to transmit a power supplying restriction request to the power supply apparatus 100.

A return process performed by the electronic apparatus 200 according to the second exemplary embodiment will be described below.

(Return Process)

The return process performed by the control unit 205 in step S412 in the power receiving process illustrated in FIG. 4 will be described with reference to a flowchart of FIG. 10. The return process illustrated in FIG. 10 can be implemented when a control unit 205 executes a computer program stored in a ROM 206.

Figure 8:
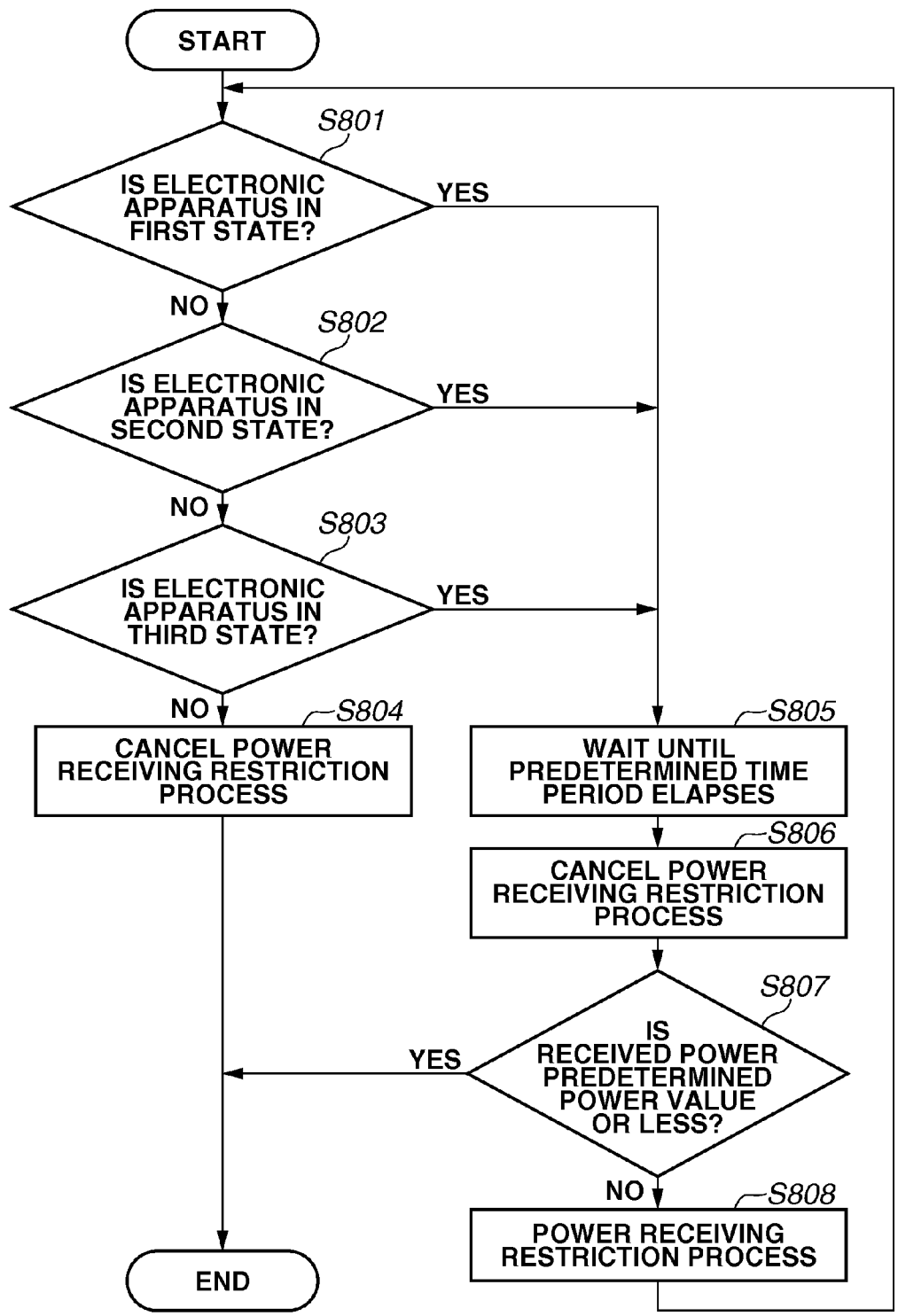
FIG. 8 is a flowchart illustrating an example of a return process of the electronic apparatus according to the first exemplary embodiment.

In step S801 to S804 illustrated in FIG. 10 are common to steps S801 to S804 illustrated in FIG. 8, and hence, description thereof is not repeated.

If the electronic apparatus 200 is in a first state (YES in step S801), the process proceeds from step S801 to S1001. If the electronic apparatus 200 is in a second state (YES in step S802), the process proceeds from step S802 to S1001. If the electronic apparatus 200 is in a third state (YES in step S803), the process proceeds from step S803 to S1001.

In step S1001, the control unit 205 controls the communication unit 217 to transmit a power supplying restriction request to request the power supply apparatus 100 to restrict power output to the electronic apparatus 200 from the power supply apparatus 100 to the power supply apparatus 100. In this case, the process proceeds to step S1002.

The power supply apparatus 100 controls the communication unit 112 to transmit a response signal to the electronic apparatus 200 when it has normally received the power supplying restriction request from the electronic apparatus 200 after stopping outputting of the power to the electronic apparatus 200 or decreasing the power output to the electronic apparatus 200.

In step S1002, the control unit 205 determines whether the communication unit 217 has received the response signal to the power supplying restriction request. If the communication unit 217 has received the response signal to the power supplying restriction request (YES in step S1002), the process proceeds from step S1002 to step S804. If the communication unit 217 has not received the response signal to the power supplying restriction request (NO in step S1002), the process returns from step S1002 to step S801.

The control unit 205 controls the communication unit 217 to transmit the power supplying restriction request to the power supply apparatus 100 in step S1001. However, the present invention is not limited to this. For example, in step S1001, the control unit 205 may control the communication unit 217 to transmit a power supplying stop request to request the power supply apparatus 100 to stop outputting the power to the electronic apparatus 200 instead of the power supplying restriction request to the power supply apparatus 100.

The electronic apparatus 200 according to the second exemplary embodiment has a similar effect to that in the first exemplary embodiment as for the process and the components common to those in the first exemplary embodiment.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261511 filed Dec. 18, 2013, which is hereby incorporated by reference herein in its entirety.

What is claimed is:

1. An electronic apparatus comprising:
a power receiving means configured to wirelessly receive power from a power supply apparatus;
a communication means configured to communicate with the power supply apparatus;
a temperature detection means configured to detect a temperature;
a detection means configured to detect whether the electronic apparatus is in a first state or a second state based on the temperature detected by the temperature detection means,
wherein the first state is a state in which the temperature is equal to or higher than a first temperature and lower than a second temperature, and
wherein the second state is a state in which the temperature is equal to or higher than the second temperature; and
a load means configured to be supplied with power received by the power receiving means,
characterized in that the electronic apparatus further includes a control means configured to:
(i) if the detection means detects that the electronic apparatus is in the first state, request the power supply apparatus to restrict a power output; and
(ii) if the detection means detects that the electronic apparatus is in the second state, restrict the power receiving means to supply power to the load means.

2. The electronic apparatus according to claim 1, further comprising:
a voltage detection means configured to detect a voltage of a battery connected to the electronic apparatus,
wherein the control means restricts the power supply from the power receiving means to the load means in a case where the voltage.

3. The electronic apparatus according to claim 1, further comprising:
a current detection means configured to detect a current flowing to a battery connected to the electronic apparatus,
wherein the control means restricts the power supply from the power receiving means to the load means in a case where the current flowing to the battery is equal to or lower than a predetermined current.

4. The electronic apparatus according to claim 1, wherein the control means restricts the power supply from the power receiving means to the load means in a case where an error relating to charging of a battery connected to the electronic apparatus is occurring in the electronic apparatus.

5. The electronic apparatus according to claim 1, wherein the control means restricts the power supply from the power receiving means to the load means in a case where an error relating to wireless power supplying from the power supply apparatus to the electronic apparatus is occurring.

6. The electronic apparatus according to claim 1, wherein, in a case where the detection means detects that the electronic apparatus is in the first state in a state where power supplied from the power receiving means to the load means is restricted, the control means cancels the restriction of the power supply from the power receiving means to the load means.

7. A power supply apparatus comprising:
a power supply means configured to wirelessly transmit power to an electronic apparatus according to claim 1; and
a processing means configured to control the power supply apparatus.

8. A method for controlling an electronic apparatus having the power receiving means and the load means, the method comprising:
wirelessly receiving power from a power supply apparatus;
detecting a temperature;
detecting whether the electronic apparatus is in a first state or a second state based on the temperature detected by the detecting,
wherein the first state is a state in which the temperature is equal to or higher than a first temperature and lower than a second temperature, and
wherein the second state is a state in which the temperature is equal to or higher than the second temperature;
performing control to, if the electronic apparatus is in the first state, request the power supply apparatus to restrict a power output; and
performing control to, if the electronic apparatus is in the second state, restrict the power supply from the power receiving means to the load means.

9. The method according to claim 8, further comprising:
detecting a voltage of a battery connected to the electronic apparatus, and restricting the power supply from the power receiving means to the load means in a case where the voltage of the battery is equal to or higher than a predetermined voltage.

10. The method according to claim 8, further comprising:
detecting a current flowing to a battery connected to the electronic apparatus, and
restricting the power supply from the power receiving means to the load means in a case where the current flowing to the battery is equal to or lower than a predetermined current.

11. The method according to claim 8, further comprising:
cancelling, in a case where it is detected that the electronic apparatus is in the first state in a state where power supplied from the power receiving means to the load means is restricted, the restriction of the power supply from the power receiving means to the load means.

12. A non-transitory storage medium storing a program for causing a computer to execute a method for controlling an electronic apparatus according to the method of claim 8.

* * * * *